United States Patent [19]

Cooper

[11] 4,316,252
[45] Feb. 16, 1982

[54] APPARATUS FOR DETERMINING THE POSITION OF AN AIRCRAFT WITH RESPECT TO THE RUNWAY

[75] Inventor: Michael G. Cooper, Renton, Wash.
[73] Assignee: The Boeing Company, Seattle, Wash.
[21] Appl. No.: 65,404
[22] Filed: Aug. 10, 1979
[51] Int. Cl.³ .................. G05D 1/06; G06F 15/50
[52] U.S. Cl. .................. 364/428; 244/183; 364/426
[58] Field of Search .......... 364/426, 428, 430, 433, 364/443; 340/27 NA; 244/183, 184, 186

[56] References Cited

U.S. PATENT DOCUMENTS

| | | | |
|---|---|---|---|
| 3,355,733 | 11/1957 | Mitchell et al. | 340/27 NA X |
| 3,382,351 | 5/1968 | Schweighofer et al. | 340/27 NA X |
| 3,644,722 | 2/1972 | Hobbs et al. | 364/433 |
| 3,868,497 | 2/1975 | Vietor | 364/430 |
| 3,979,057 | 9/1976 | Katz et al. | 364/443 X |
| 4,147,056 | 4/1979 | Muller | 340/27 NA X |
| 4,156,912 | 5/1979 | Shigeta et al. | 364/443 |
| 4,172,285 | 10/1979 | Yoshida et al. | 364/443 |

Primary Examiner—Felix D. Gruber
Attorney, Agent, or Firm—James P. Hamley; B. A. Donahue

[57] ABSTRACT

Upon landing approach to a runway, glideslope and altitude information is processed to produce an indication of ground distance to the touchdown point. Actual aircraft position is then determined by integrating the aircraft's ground speed. A display of distance from the beginning and end of the runway is provided. An alert is produced if the aircraft approaches the end of the runway at excessive speed. Further, the system may be coupled to the aircraft's autobrake system to automatically control the rate of deceleration.

8 Claims, 2 Drawing Figures

APPARATUS FOR DETERMINING THE POSITION OF AN AIRCRAFT WITH RESPECT TO THE RUNWAY

BACKGROUND OF THE INVENTION

This invention pertains to the aviation art and, more particularly, to a means for determining the position of an aircraft with respect to a runway.

The safe and efficient operation of commercial aircraft requires that the flight crew know the precise location of the aircraft with respect to the runway and that the aircraft is decelerating at a rate such that there is sufficient runway remaining for a controlled stop. Excessive decelerating forces on landing results in unnecessary wear to the aircraft's braking system as well as needless discomfort to the passengers. Should the decelerating forces be to low, however, there is the obvious risk of running off of the runway as well as the practical problem of the aircraft spending too much time on the runway thus delaying runway use by other aircraft.

Adverse weather conditions, such as fog, causing low visibility, and water or ice on the runway, conducive to skidding, can result in particularly hazardous conditions. In response to this, various approaches have been suggested for indicating to the flight crew the position of the aircraft with respect to the runway and the calculated distance to stop under present decelerating forces.

One such system uses wheel speed as a measure of airplane speed. This system suffers the obvious inadequacy that skidding occurs, particularly with slippery runways, thus resulting in significant errors.

A further system requires the placing of a special transmitter at the end of the runway. A receiver on board the aircraft processes signals from the transmitter site and provides an indication of the relative position of the aircraft with respect to the transmitter and, hence, the end of the runway. Further, the decelerating forces of the aircraft are monitored and a calculation is made to determine whether or not, under the present deceleration rate, the aircraft has adequate stopping distance. An obvious problem with this system is that it requires a special transmitter site to be located at the end of each runway.

SUMMARY OF THE INVENTION

It is an object of this invention, therefore, to provide an improved means for indicating to the flight crew of an aircraft the relative position of the aircraft with respect to a runway.

It is a further object of this invention to provide the above-described improved aircraft position indicator which does not rely on wheel speed or the existence of a ground placed transmitter.

It is a further object of the invention to provide the above described position indicator in combination with a system for automatically controlling the braking system of the aircraft such that the aircraft assumes a desired deceleration.

It is a particular object of the invention to provide a readout to the flight crew of the distance of the aircraft from both the beginning and end of the runway.

It is an additional object of the invention to provide a means for monitoring the deceleration of the aircraft on the runway and, comparing this to the distance remaining on the runway produce an alert signal if the decelerating forces are not sufficient to brake the aircraft prior to its reaching the runway's end.

Briefly, according to the invention, apparatus is provided for determining the position of an airplane with respect to a runway. The apparatus comprises a central computer which includes a means which determine the glideslope angle $\phi$ of the plane with respect to the runway. Additional means determines the instance of the plane descending to a specified altitude A on the aforementioned glideslope. From this data, the ground distance d of the aircraft from the intersection of the glideslope with the runway is calculated from the equation $d = A/\tan \phi$.

Further, wherein the intersection of the glideslope with the runway is of a predetermined distance D from the beginning of the runway, the apparatus includes a means which calculates, equation $S_o = d - D$, the distance $S_o$ of the airplane from the beginning of the runway during the instance of the airplane being at the altitude A.

Additionally, wherein the airplane includes a ground speed sensor, the apparatus further comprises a means which integrates airplane ground speed to produce an indication of airplane relative position. Suitable means updates the distance $S_o$ by said relative position to produce a continuous indication S of the distance of the airplane from the beginning of the runway.

Where the runway has a predetermined length L, the apparatus includes a means to calculate the distance R of the airplane from the end of the runway from the equation $R = L - S$.

In addition, where there is a known desired deceleration factor of the airplane as a function of position on the runway, the apparatus further comprises a braking means which responds to a control signal to effect braking of the airplane. Also, a processor monitors the airplane position and instantaneous ground speed, comparing these values with desired values, and generates and applies a control signal to the braking means causing the braking means to correct airplane deceleration to the desired factor.

An alerting means monitors airplane ground speed, decelerating factor and the distance R to produce an alert signal if the instantaneous values of the monitored parameters indicate that without additional braking the airplane speed at the end of the runway would be excessive.

DETAILED DESCRIPTION OF THE PREFERRED EMBODIMENT OF THE INVENTION

Figure 1:
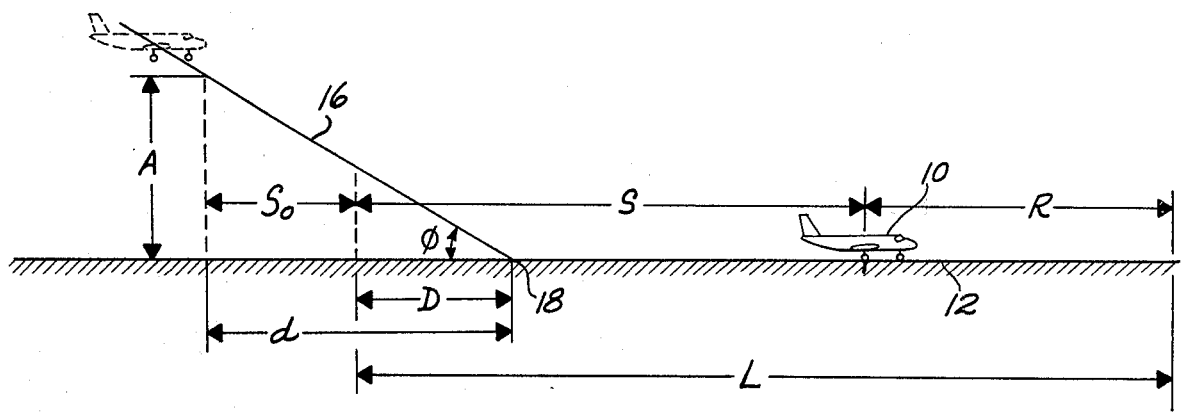
FIG. 1 illustrates the glideslope approach, and rollout of an aircraft on a runway, along with the various distances involved.

FIG. 1 illustrates an aircraft 10 taxiing down a runway 12. The length of the runway 12 is L, with the aircraft a distance S from the beginning and R from the end of the runway.

The landing approach to the runway is on a glideslope 16 at an angle $\phi$ with respect thereto. The angle $\phi$ is generally determined by a glideslope angle signal provided by the airport.

As is common with many commercial airplanes, a signal is provided when the aircraft is a given altitude A above the ground on the glideslope. For 747 type aircraft, a signal is produced when the aircraft is 53 feet above the ground. Given the glideslope angle $\phi$ and the altitude A, the instant system, as is more fully described with respect to FIG. 2, calculates the ground distance d of the aircraft from its touchdown point 18 using the equation $d = A/\tan \phi$.

Since the touchdown point 18 of the aircraft is at a known distance D from the beginning of the runway, the system also calculates the distance $S_o$ of the aircraft, measured in ground distance, from the beginning of the runway using the equation $S_o = d - D$.

Figure 2:
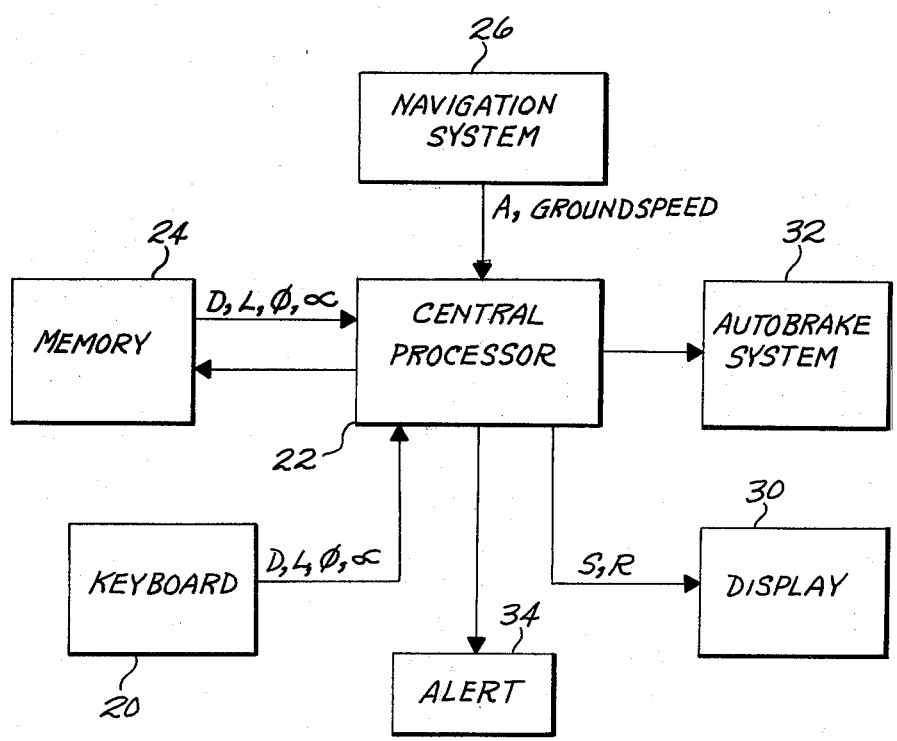
FIG. 2 is a block diagram of the preferred embodiment of the aircraft position and control apparatus according to the invention.

A ground speed signal is available in modern commercial aircraft, as an output from inertial reference or navigation systems. Thus, the instant system includes apparatus for integrating the ground speed to produce a signal proportional to relative position. Since the absolute position of the aircraft with respect to the runway is determined when the aircraft is an altitude A above the ground, the integral of the ground speed can be used relative to this point to precisely locate the distance S of the aircraft from the beginning of the runway. It should be noted that for the condition of the aircraft being on its glideslope and not yet being over the runway, the value of S may be defined as negative, whereas for subsequent glideslope and rollout conditions the value of S is positive.

Where the length L of the runway is known in advance, the instant apparatus, as will be described more fully with respect to FIG. 2, is capable of producing an indication of the distance R of the airplane 10 from the end of the runway using the equation $R = L - S$.

FIG. 2 is a block diagram illustrating the preferred embodiment of the apparatus according to the instant invention. Here, a user controlled keyboard 20 accesses a central processor 22. It is contemplated that the keyboard 20 be provided to the flight crew in the cockpit of the aircraft. On approach to a runway, the operator of the keyboard 20 inputs data such as the distance D from the beginning of the runway to the anticipated touchdown point, the total length of the runway L, the glideslope angle $\phi$ and a desired deceleration factor $\alpha$. The deceleration factor $\alpha$ is the desired deceleration profile of the aircraft versus position on the runway.

In some applications, it may not be necessary for the user to input the variables D, L, $\phi$ and $\alpha$ in the central processor 22 via a keyboard 20 due to the use of storage memory 24. Any one or all of the variables may be stored electronically in suitable memory 24 and accessed as need be by the central processor 22. Thus, for example, upon approach to a particular runway at a particular airport the user need only enter a suitable code number causing the central processor 22 to recall some or all of the variables from memory 24.

As mentioned with respect to FIG. 1, as the aircraft descends on its glideslope it reaches a specified altitude A at which time a navigation system 26 on board the aircraft produces an appropriate signal. This signal is fed to the central processor 22 which then calculates the ground distance d of the airplane from the intersection of the glideslope with the runway touchdown point from the equation $d = A/\tan \phi$. From this result, the central processor 22 can calculate the ground distance $S_o$ of the aircraft from the beginning of the runway using the equation $S_o = d - D$.

A further output of the navigation system is a signal representative of ground speed. Thus, once the central processor has determined a precise point in space with respect to the runway at the altitude A, it can then proceed to integrate the ground speed signal from the navigation system 26 to provide an output S indicative of the true distance of the aircraft from the beginning of the runway. Also, since the total length L of the runway is known, the central processor 22 can produce an output signal R indicative of the distance of the aircraft from the end of the runway, using the equation $R = L - S$. These distances S and R may be suitably displayed on a display 30 conveniently located in the cockpit. In this manner, the flight crew is given an instantaneous readout of the distance of the airplane from the beginning of the runway and/or of the distance of the airplane from the end of the runway.

Commercial aircraft are also commonly provided with an autobrake system 32 which responds to a control signal to affect braking of the aircraft. For instances wherein a desired deceleration factor has been supplied to the central processor, the central processor is capable of producing a control signal to the autobrake system 32 causing the airplane to brake at the desired deceleration rate. Thus, the system automatically compensates for the surface conditions of the runway to thereby brake the plane at a desired rate.

In addition, the central processor 22 may be programed to monitor airplane ground speed, decelerating factor and the distance to the end of the runway R and produce an alert signal if the instantaneous values of the monitored parameters indicates that without additional braking the airplane speed at the end of the runway would be excessive. Should this condition occur, a suitable alert 34 such as a warning light or audible tone is activated by the central processor 22.

While a detailed schematic diagram of the central processor 22 has not been shown in minute detail the state of the digital processing art is such that anyone of ordinary skill having commercially available processing systems available to him could, with the above discussion, easily design an operable system.

In summary, apparatus for determining the precise position of an airplane with respect to a runway has been disclosed. The apparatus is also capable of producing an alert indication if the deceleration of the airplane is not within a desired limit. Further, a means has been disclosed for automatically braking the airplane at a desired deceleration rate.

While a preferred embodiment of the invention has been described in detail, it should be apparent that many modifications and variations thereto are possible, all of which fall within the true spirit and scope of the invention.

I claim:

1. Apparatus for determining the position of an airplane, having a groundspeed indicator, with respect to a runway comprising:
   means for determining the glidescope angle $\phi$ of the plane with respect to the runway;
   means for determining that the plane is a specified altitude A above the runway on said glideslope;
   processing means including means for:
   calculating the ground distance d of the airplane from the intersection of the glideslope with the runway from the equation $d = A/\tan \phi$;
   calculating the ground distance $S_o$ of the airplane from the beginning of the runway during the instance of the airplane being at the altitude A from the equation $S_o = d-D$, where D is the predetermined distance from the beginning of the runway to the intersection of the glideslope with the runway;

integrating airplane ground speed to produce an indication of airplane relative position; and updating said distance $S_o$ by said relative position to produce a continuous indication S of the distance of the airplane from the beginning of the runway.

2. The apparatus of claim 1, wherein the runway has a predetermined length L, wherein the processing means further includes means for calculating the distance R of the airplane from the end of the runway from the equation $R = L - S$.

3. The apparatus of either of claims 1 or 2 wherein the airplane has a desired deceleration factor defining the optimum instantaneous ground speed of the airplane as a function of position on the runway, the apparatus further comprising:

braking means responsive to a control signal to affect braking of the airplane, and the processing means further includes means for monitoring airplane position and instantaneous ground speed, comparing these values with the desired values and generating and applying a control signal to said braking means causing said braking means to correct airplane deceleration to said desired factor.

4. The apparatus of claim 3 further comprising:

alerting means for monitoring airplane ground speed, decelerating factor and the distance R and producing an alert signal if the instantaneous values of said monitored parameters indicates that without additional braking the airplane's speed at the end of the runway would be excessive.

5. A method for determining the position of an airplane, having a groundspeed indicator, with respect to a runway comprising the steps of:

determining the glideslope angle $\phi$ of the plane with respect to the runway;

determining that the plane is a specified altitude A above the runway on said glideslope;

calculating the ground distance d of the airplane from the intersection of the glideslope with the runway from the equation $d = A/\tan \phi$;

calculating the ground distance $S_o$ of the airplane from the beginning of the runway during the instance of the airplane being at the altitude A from the equation $S_o = d-D$, where D is the predetermined distance from the beginning of the runway to the intersection of the glideslope with the runway;

integrating airplane ground speed to produce an indication of airplane relative position; and updating said distance $S_o$ by said relative position to produce a continuous indication S of the distance of the airplane from the beginning of the runway.

6. The method of claim 5 wherein the runway has a predetermined length L, comprising the further step of:

calculating the distance R of the airplane from the end of the runway from the equation $R = L - S$.

7. The method of either of claims 5 or 6 wherein the airplane has a desired deceleration factor defining the optimum instantaneous ground speed of the airplane as a function of position on the runway, the method comprising the further steps of:

providing braking means responsive to a control signal to affect braking of the airplane; and monitoring airplane position and instantaneous ground speed, comparing these values with the desired values and generating and applying a control signal to said braking means causing said braking means to correct airplane deceleration to said desired factor.

8. The method of claim 7 comprising the further step of:

monitoring airplane ground speed, decelerating factor and the distance R and producing an alert signal if the instantaneous values of said monitored parameters indicates that without additional braking the airplane's speed at the end of the runway would be excessive.

* * * * *